US006347888B1

(12) United States Patent
Puetz

(10) Patent No.: US 6,347,888 B1
(45) Date of Patent: Feb. 19, 2002

(54) FIBER OPTIC ADAPTER, INCLUDING HYBRID CONNECTOR SYSTEM

(75) Inventor: Curtis Lee Puetz, Apple Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/198,163

(22) Filed: Nov. 23, 1998

(51) Int. Cl.[7] .................................................. G02B 6/36
(52) U.S. Cl. ............................ 385/53; 385/78; 385/81; 385/92
(58) Field of Search ............................ 385/53–60, 62, 385/70, 72, 73, 75–78, 81, 92

(56) References Cited

U.S. PATENT DOCUMENTS

| 4,714,317 | A |   | 12/1987 | Szentesi |   |
|---|---|---|---|---|---|
| 4,902,094 | A |   | 2/1990 | Shank |   |
| 5,042,891 | A |   | 8/1991 | Mulholland et al. |   |
| 5,073,042 | A |   | 12/1991 | Mulholland et al. |   |
| 5,204,929 | A |   | 4/1993 | Machall et al. |   |
| 5,233,674 | A |   | 8/1993 | Vladic |   |
| 5,253,315 | A |   | 10/1993 | Fentress |   |
| 5,274,729 | A |   | 12/1993 | King et al. |   |
| 5,317,663 | A |   | 5/1994 | Beard et al. |   |
| 5,321,784 | A |   | 6/1994 | Cubukciyan et al. |   |
| 5,333,221 | A |   | 7/1994 | Briggs et al. |   |
| 5,333,222 | A |   | 7/1994 | Belenkiy et al. |   |
| 5,348,487 | A |   | 9/1994 | Marazzi et al. |   |
| 5,359,688 | A |   | 10/1994 | Underwood |   |
| 5,408,557 | A |   | 4/1995 | Hsu |   |
| 5,542,015 | A |   | 7/1996 | Hultermans |   |
| 5,577,145 | A | * | 11/1996 | Musk | 385/88 |
| 5,577,146 | A | * | 11/1996 | Musk | 385/92 |
| 5,647,043 | A |   | 7/1997 | Anderson et al. |   |
| 5,751,874 | A |   | 5/1998 | Chudoba et al. |   |
| 5,761,359 | A |   | 6/1998 | Chudoba et al. |   |
| 5,774,612 | A | * | 6/1998 | Belenkiy et al. | 385/72 |
| 6,022,149 | A | * | 2/2000 | So et al. | 385/53 |
| 6,027,252 | A | * | 2/2000 | Erdman et al. | 385/76 |

FOREIGN PATENT DOCUMENTS

DE      196 37 157 A1      2/1998

OTHER PUBLICATIONS

Exhibit A 1990 Brochure from Amphenol Corp. entitled "Ampheno® 954 series one piece SC connector" (2 pages).
Exhibit B Front and back covers and p. 59 from the AMP Incorporation catalog entitled "Fiber Optic Products," copyright 1991 (4 pages).
Exhibit C Front and back covers and pp. 16, 17 and 49 from the HRS catalog entitled "Optical Fibre Connectors," dated Mar. 1991 (5 pages).
Exhibit D Front and back covers and pp. 6–1 through 6–16 from the AT&T Network Systems catalog entitled "Fiber Optic Products Innovation for wide ranging applications," copyright 1995 (18 pages).

* cited by examiner

Primary Examiner—Frank G. Font
Assistant Examiner—Michael P Mooney
(74) Attorney, Agent, or Firm—Merchant & Gould P.C.

(57) ABSTRACT

A hybrid adapter permits connection of one type of connector, such as an SC-type, with a different type, such as an ST-type connector. An alternative adapter permits connection between an SC-type connector and an FC-type connector. A main body which holds the connectors in axial alignment includes a side opening. An inner housing is configured for mating with the different type connectors. The inner housing is inserted through the side opening, which is closed off by a cover. Various parts of the adapter are common between the two disclosed style adapters.

17 Claims, 8 Drawing Sheets

FIBER OPTIC ADAPTER, INCLUDING HYBRID CONNECTOR SYSTEM

FIELD OF THE INVENTION

The invention generally relates to fiber optic adapters and connectors mated to the adapters. More particularly, the present invention relates to two coaxially aligned connectors mated to an adapter, where one connector is a first type, such as an SC-type, and the other connector is a different type, such as an ST-type, or an FC-type connector.

BACKGROUND OF THE INVENTION

Fiber optics have revolutionized communications throughout the world. Fiber optics are generally thin strings of glass designed to carry light which can be grouped together.

With the increased use of fiber optics, it has been increasingly important to be able to connect and disconnect fiber optic cables from various sources. Two fiber optic cables can be optically coupled together so that they are in communication with one another by using well-known SC-type connectors and an adapter, thereby putting each fiber optic cable in communications with the other. The SC-type connectors are placed on the end of each cable and then plugged into the adapter. The adapter has two openings, each one designed to receive a connector. The adapter is usually fixed to a dividing member.

U.S. Pat. No. 5,317,663 concerns an adapter for receiving two SC-type connectors. There is a need in the art for improved adapters which are easy to manufacture, and reliable in use. There is a further need for adapters which permit joining of an SC-type connector to a different type of connector, such as an ST-type connector or an FC-type connector. There is a further need in the art for reducing manufacturing costs associated with such hybrid adapters.

SUMMARY OF THE INVENTION

According to a preferred embodiment of the present invention, an adapter is shown for connecting an SC-type fiber optic connector with a different type of fiber optic connector, such as an ST-type or an FC-type connector. The adapter includes a main body including an axial cavity extending between first and second ends. The main body further has a side opening, and an internal axial cavity including a holding arrangement for slidably receiving an inner housing which is slidably inserted into the axial cavity through the side opening. A cover closes the side opening. The inner housing includes a first mating portion defining an SC mating portion positioned at the first end of the main body. The inner housing further includes a second mating portion positioned at the second end of the main body, and defining a mating portion matable with the housing of a different type connector, such as the ST-type or FC-type connector.

In one preferred embodiment, the first mating portion of the inner housing includes a first mating half including a cylindrical member for holding a ferrule, and a projecting clip for engaging the housing of an SC-type connector. The inner housing preferably includes a second mating half matable with the first half, and also including a cylindrical member for holding a ferrule of the second connector. A split sleeve is positioned between the first and second mating halves within the cylindrical members. Each of the first and second mating halves includes a flange. Both flanges are slidably received in a groove inside the main body of the adapter. The second mating portion of the inner housing includes a cylindrical member with either external threads for receiving an FC-type connector, or bayonets for receiving an ST-type connector. The second mating portion preferably includes an alignment feature.

The present invention also relates to a method of assembly wherein an inner housing configured to mate with different types of connectors is slidably inserted into a housing through a side opening, and subsequently enclosed with a cover the side opening.

DETAILED DESCRIPTION OF THE PREFERRED EMBODIMENT

Figure 9:
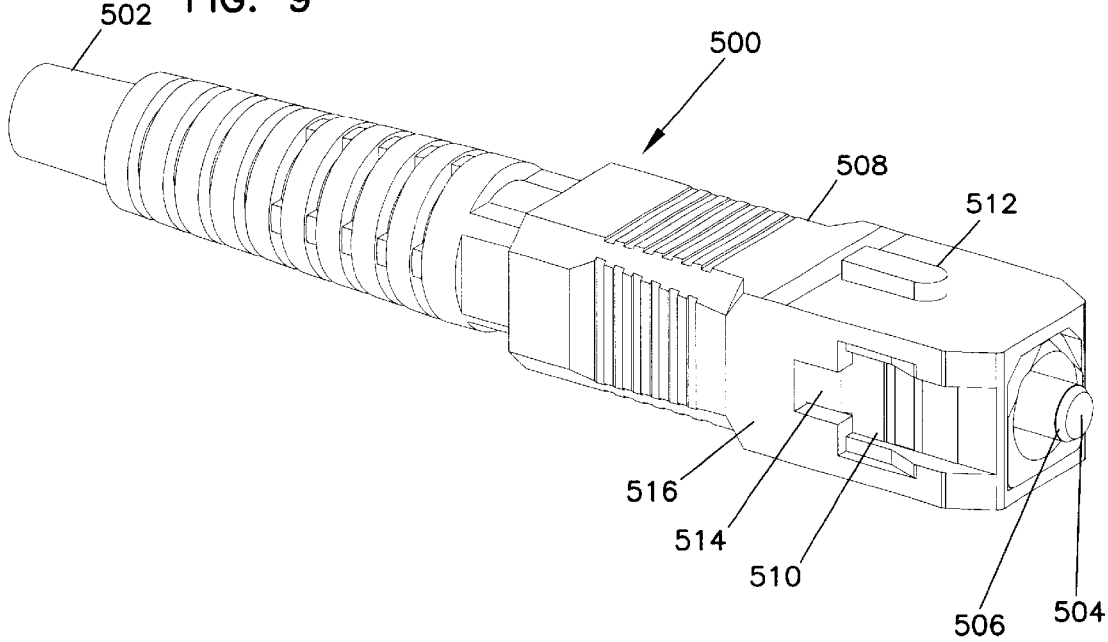
FIG. 9 shows an exemplary SC-type connector.
Figure 10:
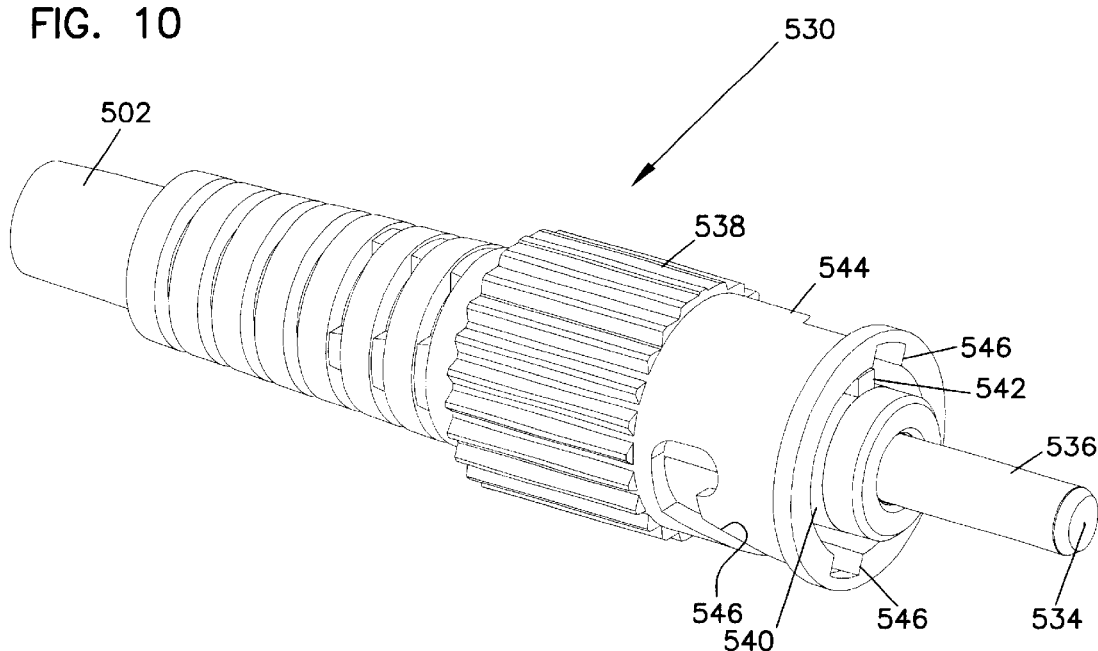
FIG. 10 shows an exemplary ST-type connector.

Referring now to FIGS. 1–4B, a first preferred embodiment of an adapter 100 is shown configured for mating with two fiber optic connectors. Each end 102, 104 receives a fiber optic connector. First end 102 receives an SC-type connector. An exemplary SC connector 500 is shown in FIG. 9. Opposite end 104 of adapter 100 is configured to receive an ST-type connector. FIG. 10 shows an exemplary ST-type connector 530. Adapter 100 is a hybrid adapter in that two different type connectors are coaxially aligned and held to permit signal transmission between the fiber of one connector and the fiber of the other connector.

Referring to FIG. 9, SC-type connector 500 includes a cable 502 containing an optical fiber 504 which is held at the end by ferrule 506. Ferrule 506 is held by housing 508 including a first inner portion 514, and an axially slidable outer portion 516. Housing 508 defines two slots 510 on opposite sides of housing 508, and a key 512 orthogonal to the sides containing slots 510 used to mount connector 500 to adapter 100.

Referring now to FIG. 10, ST-type connector 530 includes a ferrule 536 which holds a fiber 534 of cable 502. Ferrule 536 is held by a housing 538 including an inner sleeve 540, and a rotatable outer sleeve 544. Inner sleeve 540 includes a key 542. Outer sleeve 544 includes opposed slots 546 for receiving bayonets to mount connector 530 to adapter 100.

Referring again to FIGS. 1–4B, adapter 100 includes a unitary main body 106 and an access plate or cover 108 which closes a side opening 109 in main body 106. Adapter 100 has a central axis 116. The fibers of the connectors are coaxially aligned with axis 116. Adapter 100 further includes outwardly extending tabs 110, 112 to permit mounting to a dividing wall. Apertures 111, 113 are provided for receipt of a fastener, if desired. Retaining clips 114 are also provided to retain adapter 100 with a dividing wall, if desired.

An inner housing 120 of adapter 100 includes a plurality of mating portions including a first mating portion 122, a second mating portion 144, and a third mating portion 160. First and second mating portions 122, 144 form mating halves which coaxially align the ferrules and the fibers of the SC and ST connectors. First mating portion 122 defines an SC mating portion for mating with an SC-type connector like connector 500 of FIG. 9. Second mating portion 144 and third mating portion 160 define an ST mating portion for mating with an ST-type connector like connector 530 of FIG. 10.

SC portion 122 of inner housing 120 includes a first flange 124 and side tabs 126 for mating with a flange 146, and cooperating tabs 126 of second mating portion 144. SC mating portion 122 further includes a cylindrical portion 128 having an internal lip 130, and an axial bore 132. SC mating portion 122 further includes two retaining clips 134 which extend in the axial direction on opposite sides of inner housing axis 178. Second mating portion 144 includes a cylindrical portion 148 also having a lip 130, and an axial bore 132. SC mating portion 122 and second mating portion 144 are arranged where the flanges 124, 146 abut one another, and the cylindrical portions 128, 148 extend in opposite directions. The cylindrical portions 128, 148 receive an inner sleeve 140, held by lips 130 of each cylindrical portion 128, 148. Split sleeve 140 preferably includes a slot 142, and a bore 143 coaxially aligned with axis 178 of inner housing 120. Cylindrical portions 128, 148, and split sleeve 140 form a ferrule holding bore of adapter 100 for holding an end of a ferrule of each connector mounted to adapter 100. To assist with alignment of SC mating portion 122 and second mating portion 144, each flange 124, 146 includes a half ring 150, and a half recess 152 for mating with reciprocally shaped structures on the opposite flange.

Inner housing 120 further includes ST sleeve mating portion 160 defined by third mating portion 160 coaxially aligned with SC mating portion 122 and second mating portion 144. ST sleeve mating portion 160 includes a flange 162 including two opposed flat portions 164, 165. Opposed flat portion 165 includes an alignment tab 167. A cylindrical portion 166 extends in the same direction as cylindrical portion 148 of second mating portion 144. Cylindrical portion 166 is sized larger than cylindrical portion 148 of second mating portion 144, so as to overlap and receive an end of cylindrical portion 148 within bore 168 of cylindrical portion 166. An outer surface of cylindrical portion 166 is provided with two opposed bayonets 170, and an axially extending slot 172. Bayonets 170, and slot 172 provide mounting structure for mounting ST-type connector 530, the type shown in FIG. 10.

Main body 106 of adapter 100 includes a front sidewall 180, a back sidewall 182, a right sidewall 184, and a left sidewall 186. Four ridges 188, 190, 192, 194 are positioned in each corner of axial cavity 118 adjacent first end 102. Back sidewall 182 further includes a slot 196. Ridges 188, 190, 192, 194 and slot 196 are configured for receipt of SC-type connector 500, the type shown in FIG. 9. Further, retaining clips 134 engage an exterior surface of the housing of SC-type connector 500, while cylindrical portion 128 and split sleeve 140 receive a ferrule of the SC-type connector 500.

Main body 106 of adapter 100 defines an axial cavity 118 accessible through side opening 109. Axial cavity 118 receives inner housing 120. Axial cavity 118 of main body 106 contains a plurality of ridges and grooves to hold inner housing 120 in place which in turn is used to hold each ferrule. A transversely extending groove 198 is sized for slidably receiving both flange 124 and flange 146 of the first and second mating portions 122, 144. Groove 198 prevents axial movement of the first and second mating portions 122, 144. A second groove 202 is positioned on an opposite side of wall 200 within axial cavity 118. Second groove 202 receives flange 162 of ST mating portion 160. Groove 202 has a reciprocally shaped profile for engagement with flange 162, so as to receive flat portions 164, 165, thereby preventing rotation of ST portion 160 relative to main body 106. A hole 183 in back sidewall 182 receives tab 167 of flange 162. This aligns slot 196 with slot 172.

Figure 1:
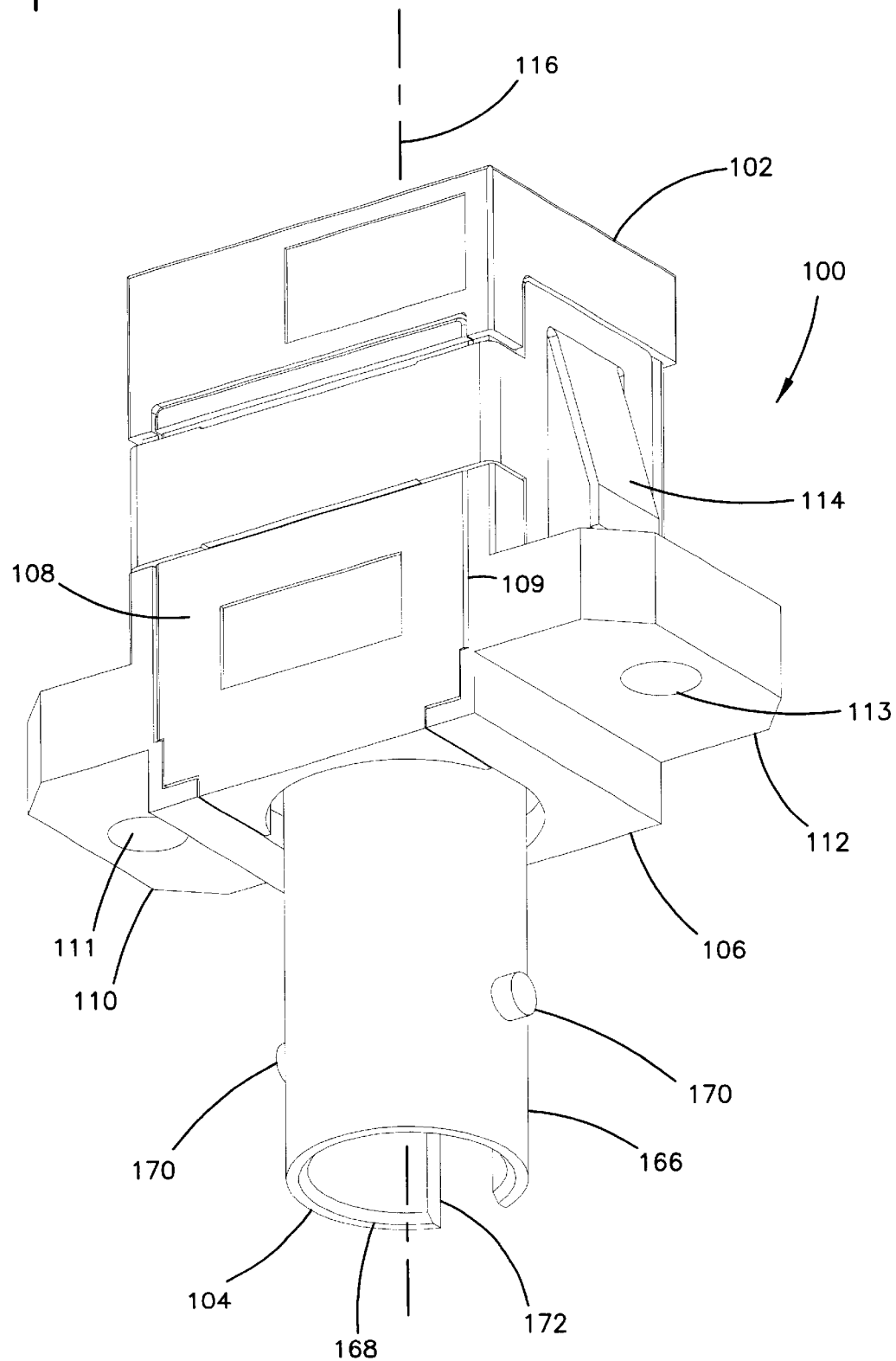
FIG. 1 is a front perspective view of a first embodiment of an adapter for mating an SC-type connector and an ST-type connector.
Figure 2:
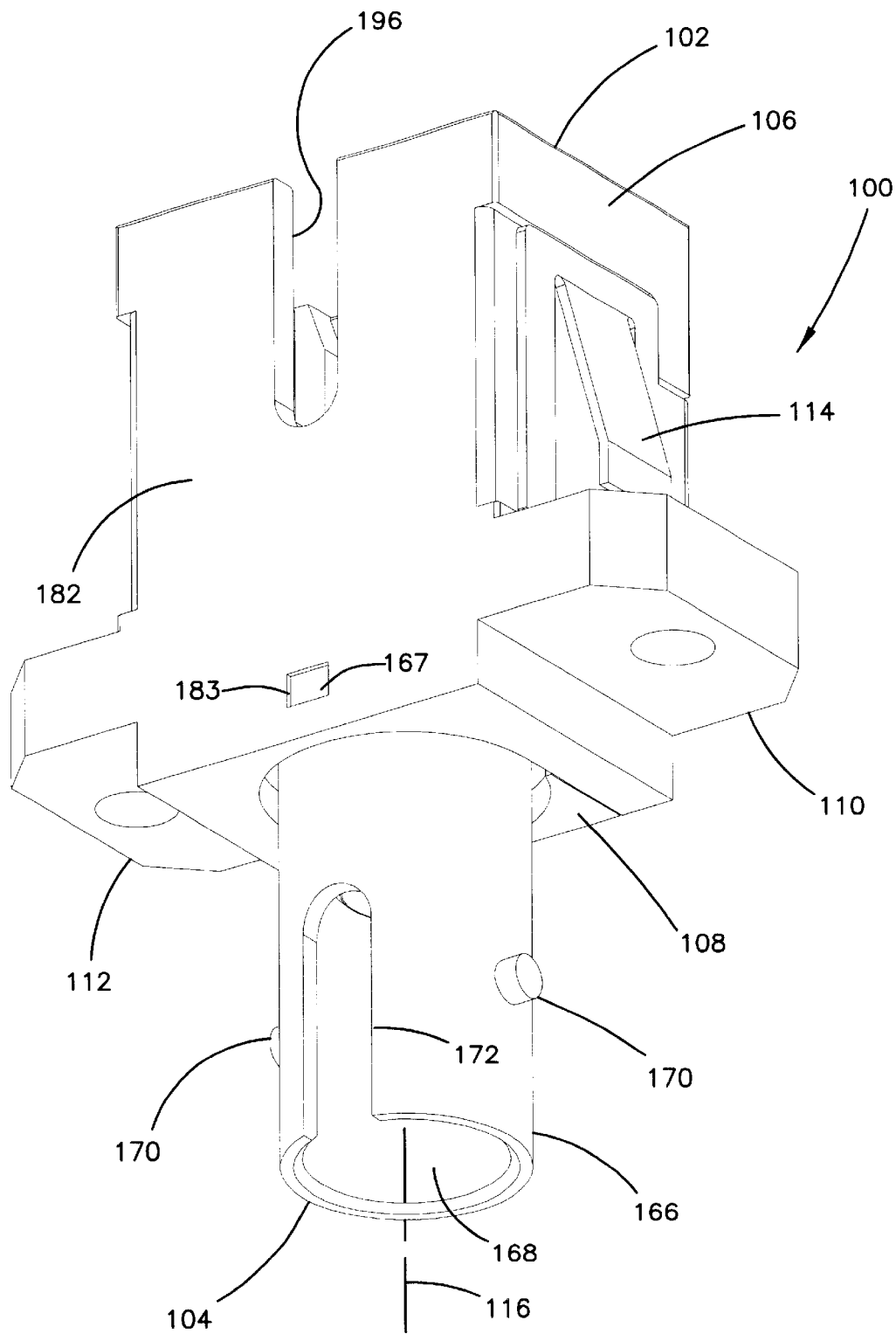
FIG. 2 is a rear perspective view of the adapter shown in FIG. 1.
Figure 3:
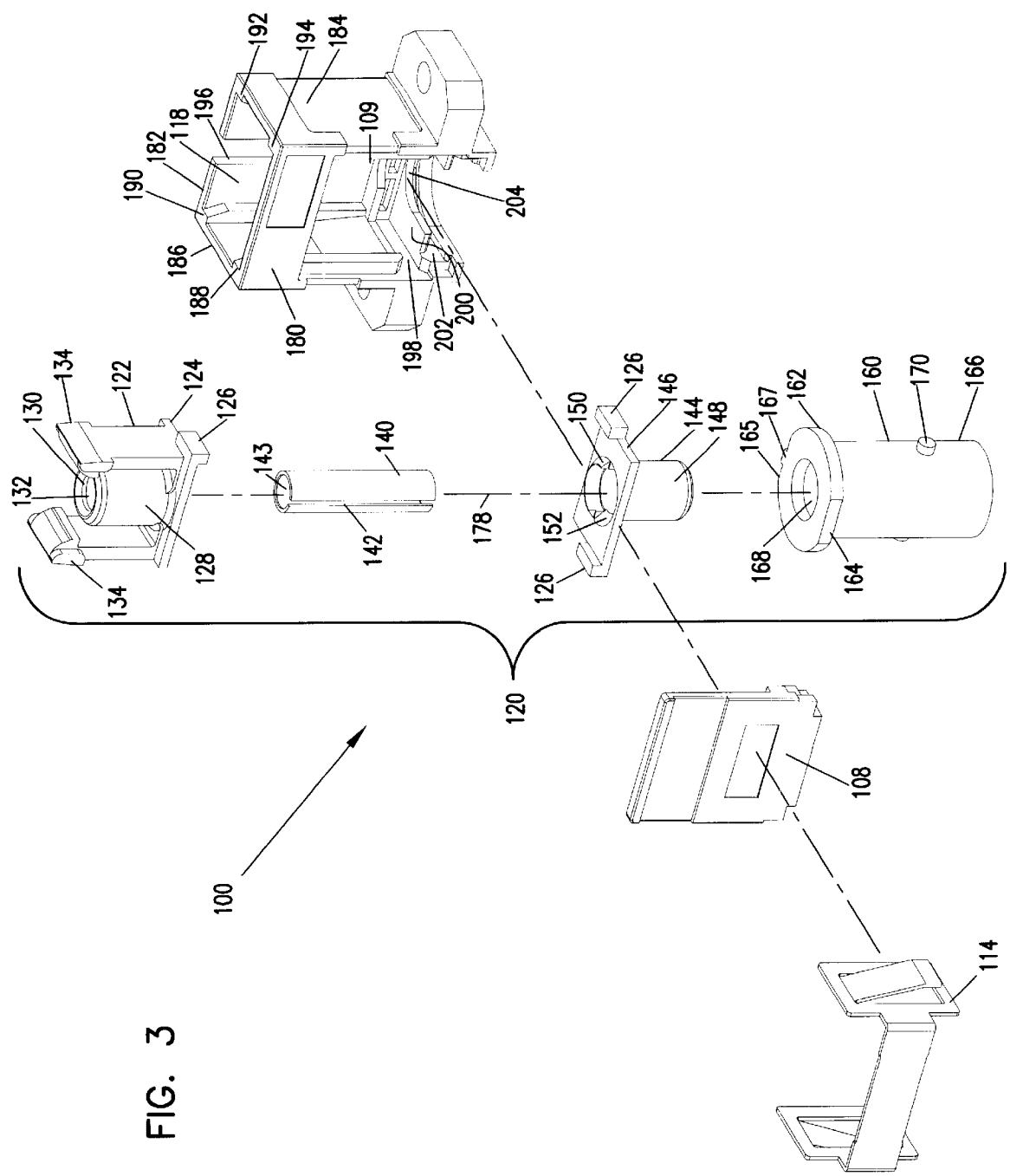
FIG. 3 is an exploded front perspective view of the adapter shown in FIG. 1.
Figure 4A:
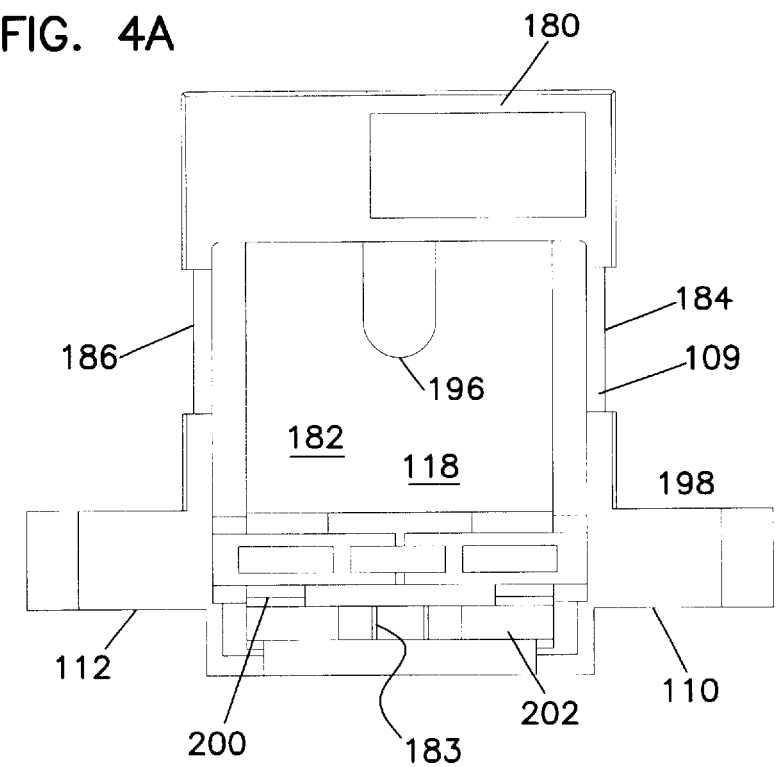
FIG. 4A is a front view of the main body of the adapter of FIG. 1.
Figure 4B:
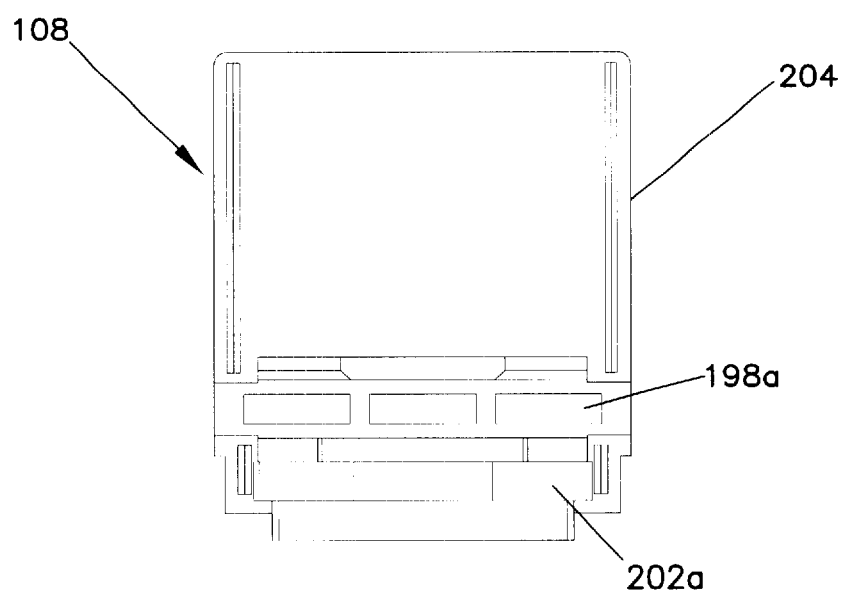
FIG. 4B is a rear view of the front cover of the adapter of FIG. 1.

As shown in FIG. 4B, cover 108 includes a main body portion 204 and two grooves 198a, 202a which align with first and second grooves 198, 202 of main body 106. Cover 108 is glued or ultrasonically welded, or otherwise fastened to main body 106 to close side opening 109. If ST sleeve mating portion 160 is installed 180° about its axis, cover 108 engages tab 167 to prevent complete closure of cover 108 to main body 106, thereby preventing misaligned slots 196, 172. Aligned slots 196, 172 permit adapter 100 to be used with connectors with keyed orientations, such as connectors with angled ends or connectors that have been tuned.

In use, adapter 100 receives SC-type connector 500 and ST-type connector 530, and securely holds them in coaxial alignment for signal transmission between the connectors. Key 512 of SC connector 500 is received in slot 196 of adapter 100. Retaining clips 134 engage slots 510 of SC connector 500. Cylindrical portion 128 and one end of inner sleeve 140 receives ferrule 506. Opposite end 104 of adapter 100 receives ST connector 530 where ferrule 536 is received by cylindrical portion 148, and an opposite end of inner sleeve 140. Key 542 is received in slot 172, and bayonet slots 546 receives bayonets 170.

Figure 5:
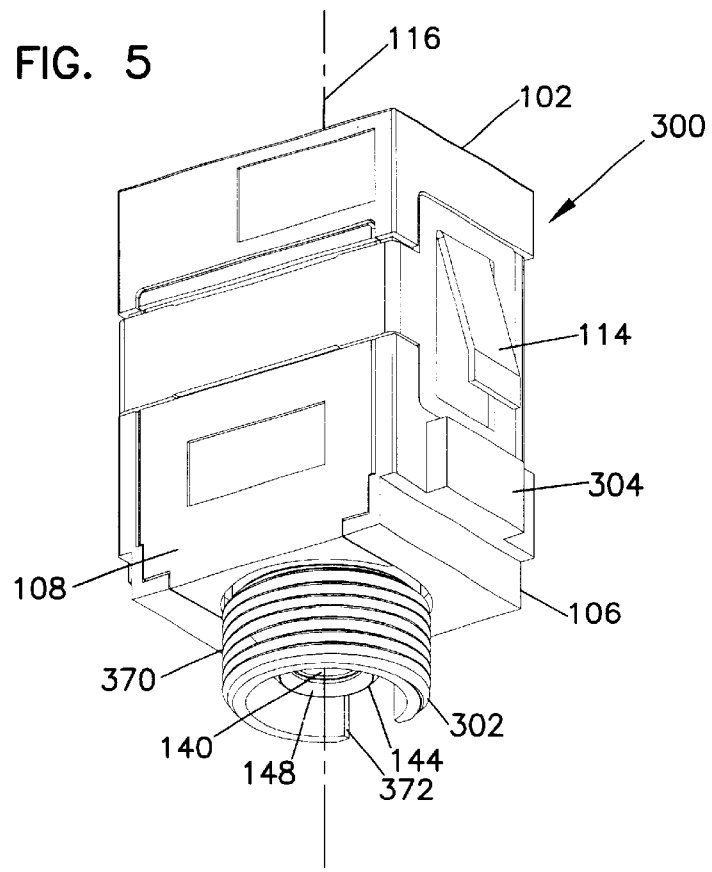
FIG. 5 is a front perspective view of a second embodiment of an adapter for mating an SC-type connector and an FC-type connector.
Figure 6:
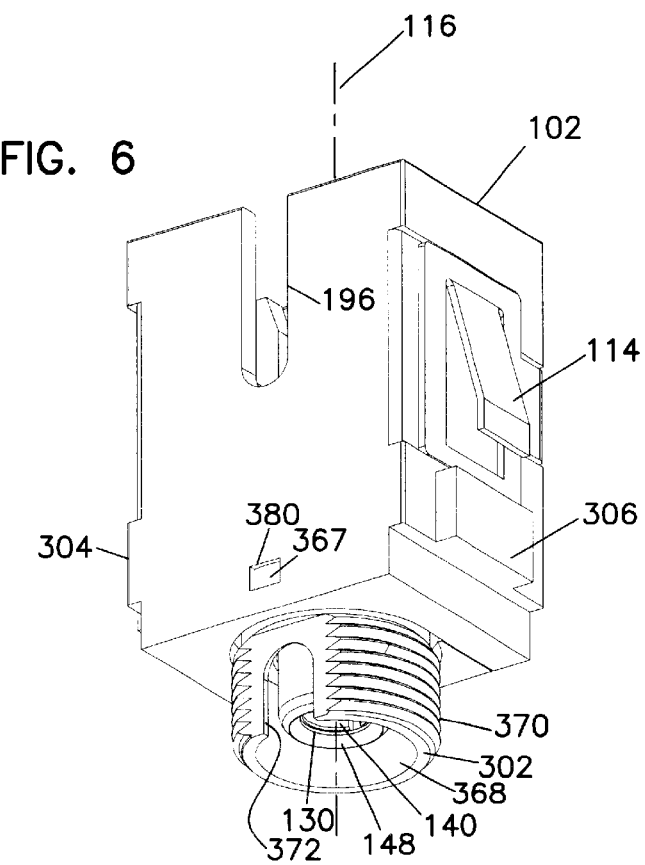
FIG. 6 is a rear perspective view of the adapter shown in FIG. 5.
Figure 7:
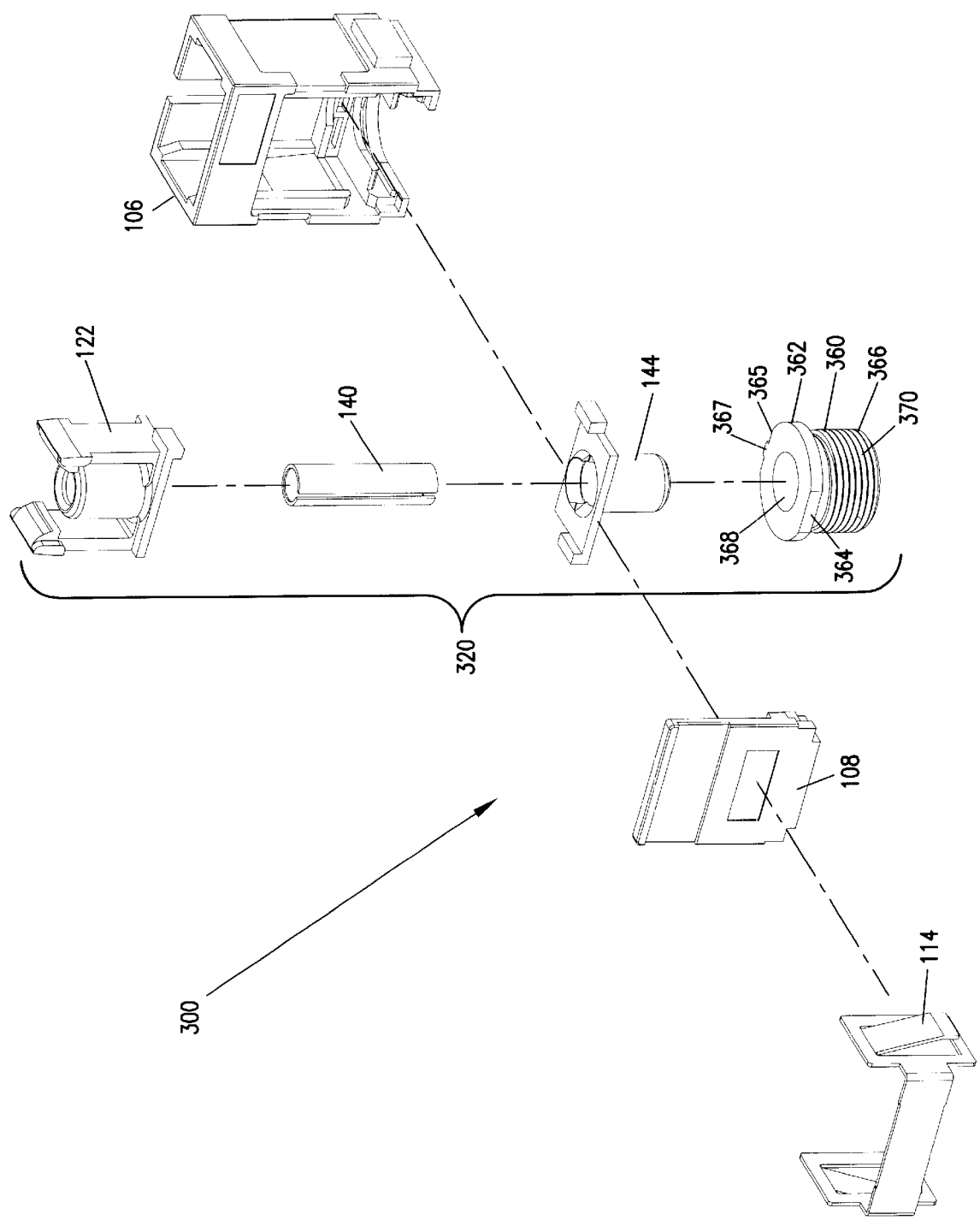
FIG. 7 is an exploded front perspective view of the adapter shown in FIG. 5.
Figure 11:
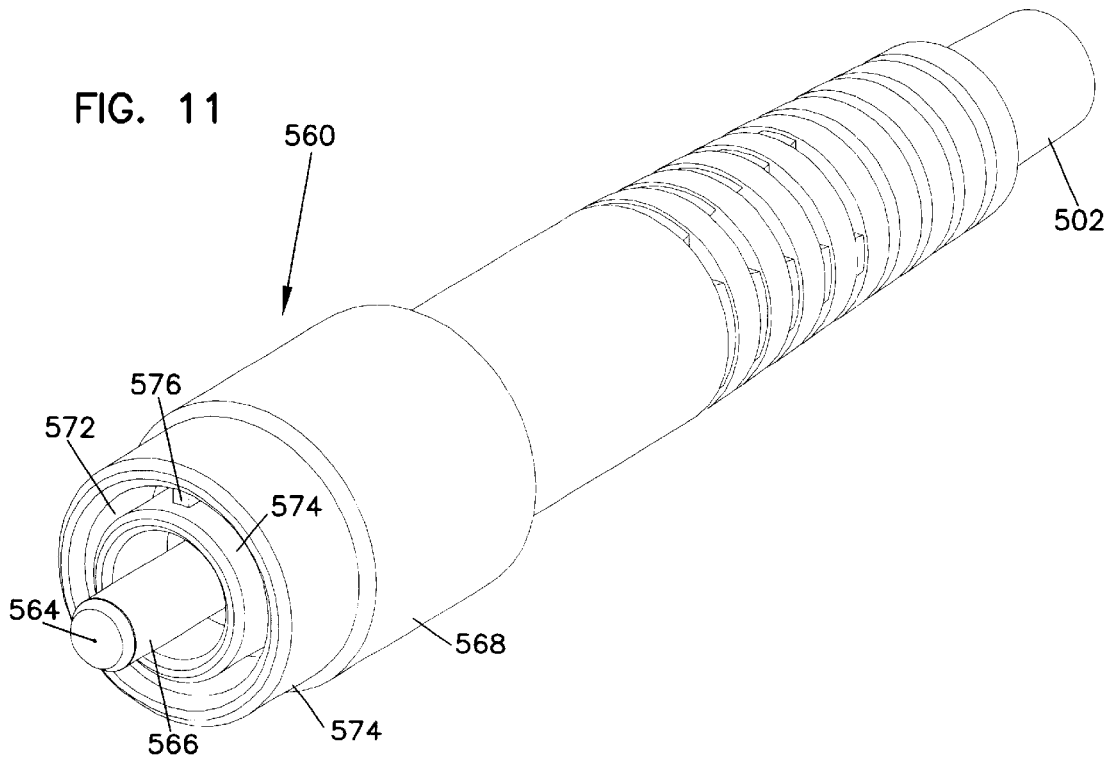
FIG. 11 shows an exemplary FC-type connector.

Referring now to FIGS. 5–7, a second preferred embodiment of an adapter 300 includes a different configuration for mating an SC-type connector 500 with an FC-type connector. An exemplary FC-type connector 560 is shown in FIG. 11. FC-type connector 560 includes a ferrule 566 which holds a fiber 564 of cable 502. An FC-type connector 560 differs from an ST-type connector 530 in several features. One significant difference is that a housing 568 includes a rotatable outer sleeve 570 including internal threads 572 for mating with a threaded adapter. Inner sleeve 574 holds ferrule 566 which in turn holds fiber 564.

For adapter 300, like parts have been numbered with the corresponding numbers of parts in adapter 100 shown in FIGS. 1–4B. End 302 of adapter 300 is configured and arranged for mating with FC-type connector 560, such as shown in FIG. 11. Adapter 300 further includes smaller retaining tabs 304, 306, relative to adapter 100. Inner housing 320 includes an SC mating portion 122, a split sleeve 140, a second mating portion 144, and an FC mating portion 360. FC mating portion 360 includes a flange 362 including opposed flat portions 364, 365. Flat portion 365 includes an outwardly extending tab 367, which is received in a hole 380 of main body 106. FC mating portion 360 further includes a cylindrical portion 366 sized larger than cylindrical portion 148 of second mating portion 144 to overlap and receive an end of cylindrical portion 148. An outer surface of cylindrical portion 366 includes threads 370, and an axially extending slot 372 for mating with FC-type connector 560. Bore 368 of cylindrical portion 366 is coaxially aligned with cylindrical portions 128, 126 of SC mating portion 122, and second mating portion 144, respectively.

In a like manner as with respect to adapter 100, use of adapter 300 includes SC connector 500 securably held to adapter 300. Opposite end 302 receives FC connector 560 where cylindrical portion 148, and the opposite end of inner sleeve 140 receives ferrule 566. Threads 572 threadably engage threads 370 to securably mount FC connector 560 to adapter 300. Key 576 is received in slot 372.

As can be seen, adapter 100, and adapter 300 have several common parts, thereby providing manufacturing advantages for manufacturing and assembling an SC/ST hybrid adapter 100 or an SC/FC hybrid adapter 300.

Figure 8:
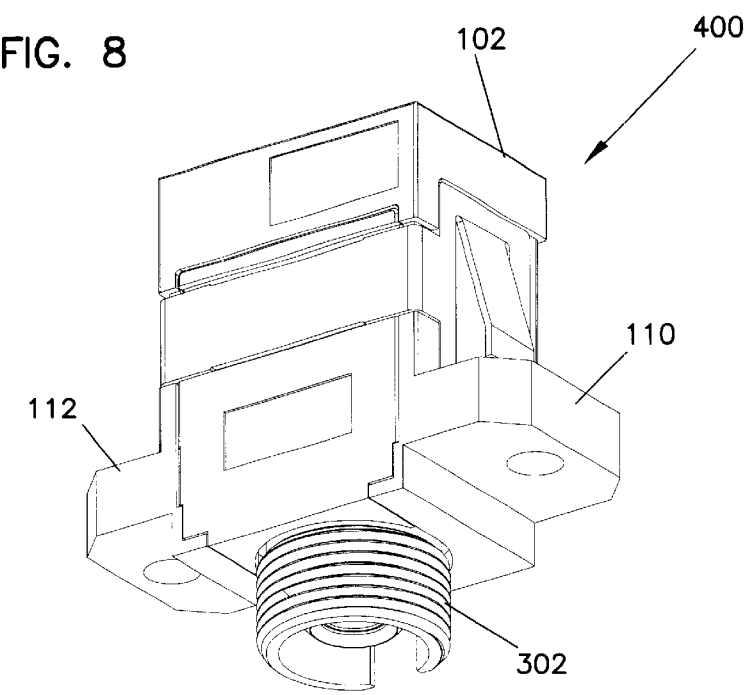
FIG. 8 is a front perspective view of a third embodiment of an adapter for mating an SC-type connector and an FC-type connector, and further including extended tabs like the adapter of FIG. 1.

Referring now to FIG. 8, a third preferred embodiment of an adapter 400 is shown including the SC mating end 102, and the FC mating end 302, as shown in the adapter 300 of FIGS. 5–7, and the extended tabs 110, 112 of adapter 100 as shown in FIGS. 1–4B.

The above specification and examples provide a complete description of the manufacture and use of the invention. Since many embodiments of the invention can be made without departing from the spirit and scope of the invention, the invention resides in the claims hereinafter appended.

What is claimed is:

1. An adapter for holding first and second fiber optic connectors in coaxial alignment, the first connector having a first connector portion, the second connector having a second connector portion different from the first connector portion, the adapter comprising:
   a main body having an axial cavity extending between first and second ends, the main body having a side opening, the axial cavity defining first and second grooves extending transversely to the axial direction and communicating with the side opening;
   a cover closing the side opening; and an inner housing disposed within the main body, the inner housing including:
      a first mating portion defining an SC mating portion positioned at the first end of the main body, the SC mating portion including a first cylindrical portion and a retaining clip, the first cylindrical portion and the retaining clip extending in the axial direction, the SC mating portion further including a first flange received by the first groove; and
      a second mating portion positioned at the second end of the main body, the second portion including a different adapter configuration from the SC mating portion, the second mating portion including a second flange received by the second groove.

2. The adapter of claim 1, wherein the second mating portion defines an ST mating portion including a cylindrical portion extending in the axial direction and two outwardly projecting bayonets extending from the cylindrical portion, the cylindrical portion including an axially extending slot.

3. The adapter of claim 1, wherein the second mating portion defines an FC mating portion including an externally threaded cylindrical portion, extending in the axial direction, and an axially extending slot in the cylindrical portion.

4. The adapter of claim 2, wherein the second flange includes a first flat segment, and an opposed second flat segment including a central projecting tab, extending transverse to the axial direction.

5. The adapter of claim 3, wherein the second flange includes a first flat segment, and an opposed second flat segment including a central projecting tab, extending transverse to the axial direction.

6. The adapter of claim 1, wherein the inner housing includes a third mating portion including a second cylindrical portion, and a third flange, the second cylindrical portion extending in an opposite direction to the first cylindrical portion, the third flange positioned in the first groove adjacent to the first flange, and the inner housing including a split sleeve coaxially aligned and positioned within the first and second cylindrical portions.

7. An adapter for holding first and second fiber optic connectors in coaxial alignment, the first connector defining an SC-type fiber optic connector, the second connector defining a different type of fiber optic connector to the SC-type connector, wherein the second connector is selected from the group consisting of an ST-type and an FC-type, the adapter comprising:
   a main body having an axial cavity extending between first and second ends, the main body having a side opening, the axial cavity including a holding arrangement for slidably receiving an inner housing as the inner housing is inserted into the axial cavity through the side opening,
   a cover closing the side opening; and
   an inner housing mounted to the holding arrangement, the inner housing including:
      a first mating portion defining an SC mating portion positioned at the first end of the main body, the SC mating portion including a first portion defining a ferrule receiving bore, and a retaining clip, the ferrule receiving bore arranged to receive the ferrule of the SC-type connector, the retaining clip engageable with an outer housing of the SC-type connector;
      a second mating portion positioned at the second end of the main body, the second mating portion including a second portion defining a ferrule receiving bore, the ferrule receiving bore of the second portion coaxially aligned with the ferrule receiving bore of the first portion and arranged to receive the ferrule of the second connector, the second mating portion defining a cylindrical mating portion matable with a housing of the second connector.

8. A method of assembly of an adapter for use in holding first and second fiber optic connectors in coaxial alignment, comprising the steps of:
   providing a main body having an axial cavity extending between first and second ends, the main body having a side opening;
   slidably inserting an inner housing through the side opening, the inner housing held by the main body from axial movement, the inner housing including first and second mating ends, the first mating end defining a first type of fiber optic connection portion for mating with the first fiber optic connector inserted into the first end of the main body, the first fiber optic connector defining a first type of fiber optic connector, the second mating end defining a second type of fiber optic connection portion for mating with the second fiber optic connector inserted into the second of the main body, the second fiber optic connector defining a second type of fiber optic connection portion different from the first type; and mounting a cover to the main body to close the side opening.

9. The method of claim 8, wherein the first type of fiber optic connection portion defines an SC-type, and wherein the second type of fiber optic connection portion defines an ST-type.

10. The method of claim 8, wherein the first type of fiber optic connection portion defines an SC-type, and wherein the second type of fiber optic connection portion defines an FC-type.

11. The method of claim 8, further comprising the steps of:

mounting a split sleeve between first and second mating portions;

mating a flange half of the first mating portion with a flange half of the second mating portion to form a first inner housing portion, the first inner housing portion having a flange;

axially mating a second inner housing portion to the first inner housing portion, the second inner housing portion having a flange, the mated first and second inner housing portions coaxially aligned, the first mating portion matable to the first type of connector, the second mating portion and the second inner housing portion matable to the second type of connector;

sliding the mated first and second inner housing portions through the side opening in the main body, wherein the flange of the first inner housing portion resides in a first groove of the main body, wherein the flange of the second inner housing portion resides in a second groove of the main body.

12. The method of claim 11, wherein the flange of the second inner housing portion includes a tab, wherein the sliding step includes sliding the tab into a recess in the main body.

13. An adapter for use in holding first and second fiber optic connectors in coaxial alignment, comprising:

a main body having an axial cavity extending between first and second ends, the main body having a side opening;

an inner housing received through the side opening, the inner housing held by the main body from axial movement, the inner housing including first and second mating ends, the first mating end defining a first type of fiber optic connection portion for mating with the first fiber optic connector inserted into the first end of the main body, the first fiber optic connector defining a first type of fiber optic connector, the second mating end defining a second type of fiber optic connection portion for mating with the second fiber optic connector inserted into the second of the main body, the second fiber optic connector defining a second type of fiber optic connection portion different from the first type; and a cover mounted to the main body to close the side opening.

14. The adapter of claim 13, wherein the first type of fiber optic connection portion defines an SC-type, and wherein the second type of fiber optic connection portion defines an ST-type.

15. The adapter of claim 13, wherein the first type of fiber optic connection portion defines an SC-type, and wherein the second type of fiber optic connection portion defines an FC-type.

16. The adapter of claim 13, wherein the inner housing includes:

first and second mating portions each including a flange half;

a split sleeve between the first and second mating portions;

the flange half of the first mating portion and the flange half of the second mating portion mated to form a first inner housing portion, the first inner housing portion having a flange formed by the mated flange halves;

a second inner housing portion axially mated to the first inner housing portion, the second inner housing portion having a flange, the mated first and second inner housing portions coaxially aligned, the first mating portion matable to the first type of connector, the second mating portion and the second inner housing portion matable to the second type of connector;

wherein the mated first and second inner housing portions are received through the side opening in the main body, wherein the flange of the first inner housing portion resides in a first groove of the main body, wherein the flange of the second inner housing portion resides in a second groove of the main body.

17. The adapter of claim 16, wherein the flange of the second inner housing portion includes a tab, wherein the tab is received in a recess in the main body.

* * * * *